INVENTOR.
Richard H. Smith
BY (signature)
ATTORNEY.

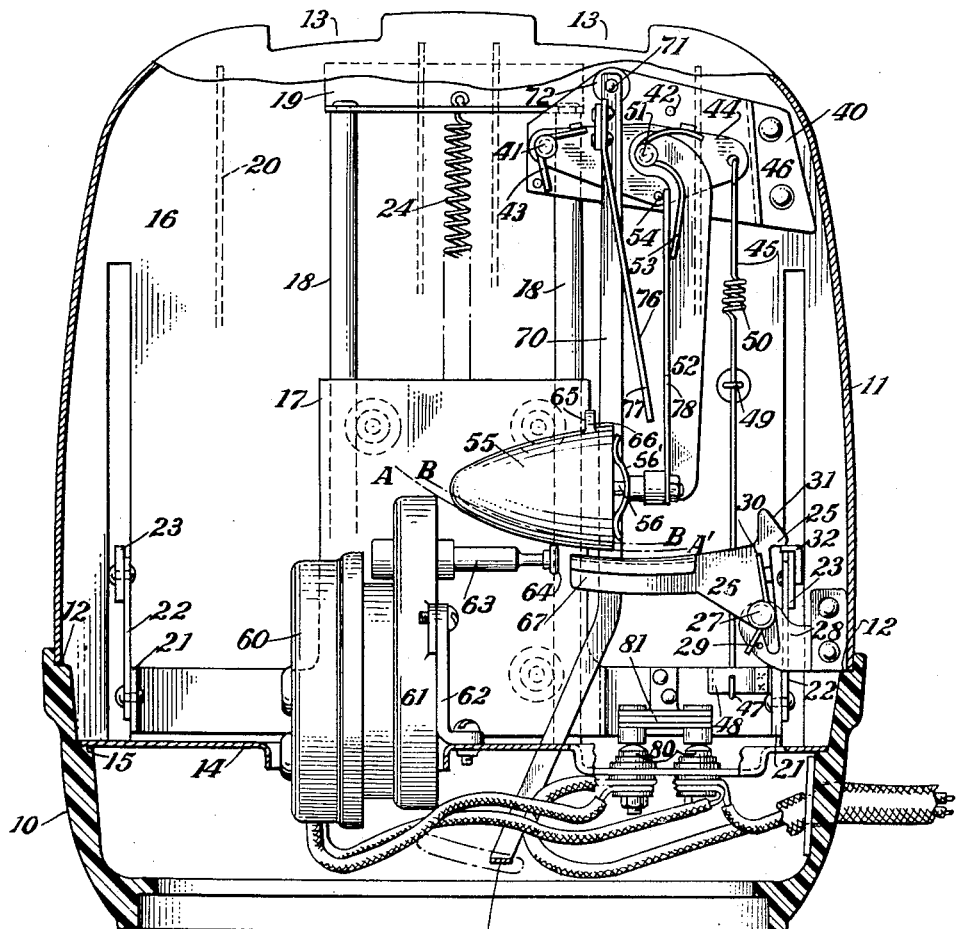
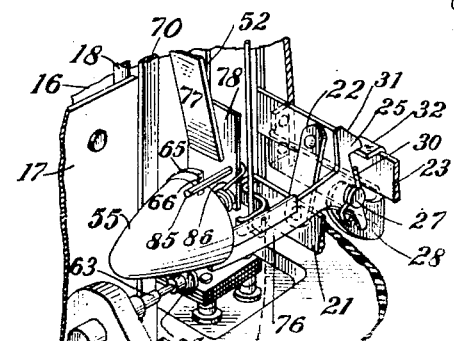
Fig. 2
Fig. 3

Patented Aug. 25, 1953

2,649,729

UNITED STATES PATENT OFFICE 2,649,729

ELECTRIC TOASTER

Richard H. Smith, Canton, Ohio, assignor to The Hoover Company, North Canton, Ohio, a corporation of Ohio Application May 31, 1952, Serial No. 291,039

18 Claims. (Cl. 99—328)

This invention relates to toasters and more particularly to a timing mechanism therefor.

According to the present invention the power unit for the timer is a constant speed electric or other motor which operates through a special gearing arrangement to actuate a carriage release mechanism to terminate toasting intervals.

According to the broadest aspects of the present invention the gearing is engaged by movement of the bread carriage to toasting position and disengaged when the bread carriage is returned to receiving position. The constant speed power source may be controlled by movement of the bread carriage to and from toasting position or it may be separately controlled since in any event the gearing between the power source and the latch releasing mechanism is controlled by such movement of the bread carriage.

When toasters are operated repeatedly in rapid succession the toaster gets hotter and hotter until a point of equilibrium is reached. As a result, if the timed intervals are of the same duration for each toasting interval, and the timed interval is set properly for timing the first interval, starting with a cold toaster, for intervals after the first, the toast is overdone. It has therefore been necessary to successively shorten the timed intervals after the first until a condition of equilibrium is reached.

It has been proposed to vary the timed intervals by a thermal element responsive to toaster temperature so that the timed interval will be proper regardless of how soon a toasting operation is initiated after a previous one.

According to the present invention the gear ratio between a constant speed power unit and the latch release mechanism is varied by a thermal element responsive to toaster temperature. The arrangement is such that the ratio may be varied by infinitesimal increments depending upon the change in toaster temperature during or between toasting intervals. The arrangement is such that the thermal element comes into play during each toasting period including the first.

Specifically, according to the present invention, a curved cone transmission drum is utilized to transmit motion from a constant speed power source to the latch release mechanism. The cone is pivoted to move in the arc of a circle and the longitudinal curve of its surface is an arc of the same circle. A thermally responsive element is arranged to move the cone responsive to toaster temperature. During toasting intervals the surface of the cone is constantly in frictional contact with a small friction gear driven by the constant speed motor. As the toaster temperature rises the cone is moved so that the friction gear contacts the surface of the cone nearer its apex and thus increases the speed of rotation of the cone and shortens the duration of toasting intervals as the toaster heats up. At the end of each toasting interval the cone is moved away from the friction gear and at the initiation of toasting intervals the cone is returned into contact with the friction gear.

The thermally responsive element is also manually adjustable. An adjustable support is provided for the thermally responsive element to further determine the axial point on the cone's surface which will be contacted by the friction gear. The adjustment is for the purpose of adjusting the timer for making various colors of toast.

Other objects and advantages of the invention will become apparent as the description proceeds when taken in connection with the accompanying drawings in which:

Figure 2 is a sectional view of the toaster of Fig. 1 showing the timing mechanism in plan view; and Figure 3 is a view similar to Fig. 1 showing a variation of the way in which the cone is made to start rotation from a fixed point for each toasting interval.

Figure 1:
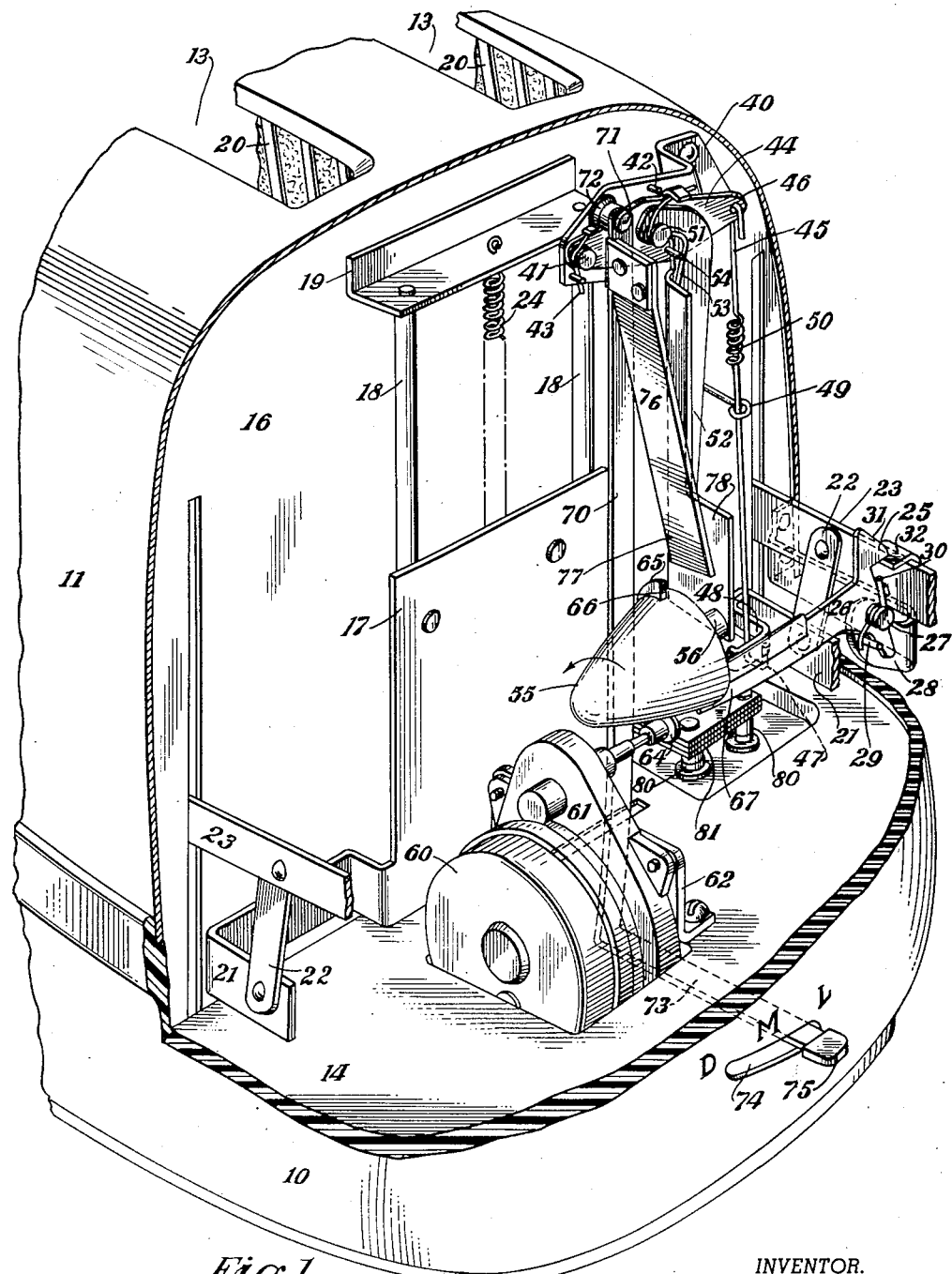
Figure 1 is a perspective view of the toaster of this invention with the front of the toaster broken away to show the details of the timing mechanism.

Referring to the drawings, the reference numeral 10 represents the base of the toaster which may be made of any suitable insulating heat resistant material such as hard rubber or "bakelite."

An appearance housing 11 is supported on a ledge 12 of base 10 and is provided with bread receiving slots 13. A bottom plate 14 is supported on a ledge 15 of base 10 and forms the support for the entire mechanism housed within the appearance housing 11. The interior of the appearance housing 11 is divided into a toasting oven and a mechanism compartment by a dividing plate 16.

A carriage plate 17 is mounted for vertical reciprocation in a manner well known in the art by guide posts 18 supported at their lower ends on plate 14 and at their upper ends on a bracket 19 secured to the dividing plate 16. The carriage plate 17 carries bread carriers positioned in the toasting oven beneath the slots 13 and between main heaters 20.

Lugs 21 extend laterally to either side of the carriage 17. Links 22 are pivoted to the lugs 21 at their lower ends and to actuating arms 23 at their upper ends. At their rear ends the arms 23 are pivoted to the walls of the toasting oven and at their forward ends are extended through a slot in the front of the appearance housing 11 for manual manipulation in a manner well known in the art. Downward movement of the arms 23 will move the carriage 17 and bread carriers downward to toasting position against the bias of spring 24, anchored at its upper end to bracket 19 and at its lower end to the carriage 17.

The carriage 17 is latched in its downward position by a hook 25 on latch lever 26 pivoted at 27 to a bracket 28 supported from the dividing plate 16. The latch lever 26 is spring biased clockwise to latching position against a stop 29 by a spring 30. Above the hook 25 of latch lever 26 is a cam surface 31 which, in the modification of Fig. 3, is engaged by a lug 32 carried by one of the arms 23 when the latter are moved downwardly. When the arms 23 are moved downwardly the lever 26 is pivoted counterclockwise to permit the lug 32 to move below the hook 25 at which time the spring 30 returns the hook 25 to latching position.

A bracket 40 is attached to the dividing plate 16 near the top of the latter. Pivoted at one end to the bracket 40 at 41 and normally spring-biased counterclockwise against a stop 42 by spring 43 is a lever arm 44. The lever arm 44 is moved clockwise against the bias of spring 43 by a rod 45 pivoted to the end 46 of the lever 44 at its upper end and having a hooked lower end 47 which engages beneath an outwardly struck portion 48 on one of the lugs 21 when the arms 23 are moved to lowered position. The rod 45 is guided by a guide 49 attached to the dividing plate 16 so that its lower hooked end 47 will always be below the member 48. The rod 45 is coiled into a spring at 59 for a purpose which will appear hereinafter.

Pivoted to the arm 44 intermediate its ends at 51 is the upper end of an angle shaped arm 52. The arm 52 is normally spring-biased clockwise against a stop 54 on arm 44 by a spring 53. At its lower end the arm 52 carries a spindle 56 on which a convex cone 55 is mounted for rotation. In the modification of Figs. 1 and 2 a light spring 56' is provided for holding the cone 55 in a fixed position when it is not being driven.

The surface of the cone 55 is longitudinally curved in the arc of a circle as shown by the dot-dash arc A—A' (Fig. 2), the center of which is the pivot point 51 for the arm 52.

A constant speed electric motor 60 and its reduction gear housing 61 is mounted on the plate 14 by a suitable bracket 62. A rotatable shaft 63 extends from the upper rear side of the housing 61 and carries a small friction gear 64 of rubber or other suitable friction material, which contacts the arc-shaped surface of the cone 55 when the carriage 17 is in its downward position regardless of the pivoted position of the arm 52 about its pivot 51. The surface of cone 55 is moved out of contact with the friction gear 64 when the arm 44 is pivoted counterclockwise about its pivot 41. In other words each point on the cone's surface 55 moves upwardly to a point lying on the arc B—B of Fig. 2 so as to be free of the friction gear 64.

Adjacent the base of the cone 55 is a cam 65 having an abrupt end or shoulder 66. The direction of rotation of the motor 60 is such that the cone is rotated counterclockwise in the direction of the arrow as shown in Fig. 1. In the modification of Figs. 1 and 2, the cam 65 is so placed on the cone 55 that the latter makes one complete revolution in timing each toasting interval. As the cone 55 rotates the cam 65 engages the end 67 of latch lever 26 and gradually pivots it counterclockwise. The design is such that as the end 66 of cam 65 approaches the end 67 of lever 26, the hook 25 will clear the lug 32 and release the carriage 17 for upward movement under the bias of the spring 24. The end 67 of lever 26 is immediately returned to its uppermost position when the carriage 17 moves upwardly but the cone 55 and its cam 65 has moved out of the way. The manner in which the cam 65 coacts with the lever 26 when the carriage is moved to toasting position will be explained hereinafter.

A lever 70 is pivoted at its upper end to the bracket 40 at 71 and is provided with a friction washer 72 so that it will stay in the position in which it is placed. The lower end of lever 70 is extended forwardly at 73 so as to extend through a slot 74 in the base 10. The extension 73 is provided with a manipulating button 75 and the base above the slot 74 is provided with indicia "D," "L" and "M" for a purpose which will later become apparent.

Near its upper end the lever 70 carries a bimetallic element 76 which extends downwardly and has its lower end 77 positioned to the left of a lug 78 on lever 52 so that the lever 52 is moved to the right as the bimetallic element heats up during toasting intervals. For toasting intervals after the first the lug 78 may form a stop to limit return movement of the cone 55 and thus determine the axial point on the conical surface which will come into engagement with the friction gear 64.

The heaters 20 and the electric motor 60 are electrically connected to spaced contacts 80 insulatedly carried by the plate 14 and adapted to be bridged by the bridging contact 81 insulatedly carried on a spring arm attached to one of the lugs 21 so that the heaters 20 and motor 60 are simultaneously energized when the carriage 17 is moved to its lower position and simultaneously deenergized when it is released for upward movement. The motor 60 may be controlled by a separate manual switch, if desired, as will appear hereinafter.

The electric motor 60 is preferably of the type which stops quickly after being deenergized so that it will not overrun. In any event, the cone 55 is moved away from the gear 64 as soon as the latch arm 26 is actuated to release the carriage for upward movement.

In the modification of Fig. 3, the cone 55 is designed to move only a part of a revolution during each timing interval and to be returned to its original starting position at the termination of each toasting interval. For that purpose a stop pin 85 projects from the lug 78 of arm 52 and a light torsion spring 86 is biased to rotate the cone 55 clockwise so as to bring the shoulder 66 of cam 65 against the pin 85 when the surface of the cone 55 is moved out of engagement with the friction gear 64.

*Operation*

In the position shown in Figs. 1 and 2 the toaster is set for making light toast, the lever 70 being positioned to the right beneath the indicia "L." The lower end 77 of bimetal 76 will be positioned close to the lug 78 of lever 52.

Bread is inserted into the slots 13 so as to rest on the bread carriers (not shown) between the heaters 20. The outer ends of arms 23 (not shown) are then grasped and moved to downward position which will move the carriage 17 and bread carriers to downward position against the bias of spring 24.

As the arms 23 are moved downwardly the member 48 engages the hook 47 on the lower end of rod 45 and pivots the arm 44 clockwise. Since the arm 52 is held against stop 54 by spring 53, the arm 52 and cone 55 will also be moved clockwise until the surface of the cone 55 engages the friction gear 64. The spring 50 of rod 45 will then be elongated to place the surface of the cone 55 in good frictional engagement with the friction gear 64.

In the position shown in Figs. 1 and 2 the cone 55 has been rotated from its initial starting position and the cam 65 is shown positioned upwardly. However, in its initial starting position the cam 65 is positioned downwardly. The portion of the cam 65 adjacent the shoulder 66 is positioned above the end 67 of lever 26. As the cone 55 approaches the friction gear 64 the cam 65 engages the end 67 of lever 26 and pivots it counterclockwise. In the meantime the lug 32 has moved below the hook 25 of lever 26. At the same time the bridging contact 81, which is spring-biased downwardly, engages the contacts 80 and energizes the motor 60 and the heaters 20. The motor 60 will immediately begin to rotate the cone 55 counterclockwise and the cam 65 will ride off the end 67 of lever 26 to permit the spring 30 to move the lever 26 clockwise to bring the hook 25 above the lug 32, latching the carriage 17 in toasting position.

In the position shown in Figs. 1 and 2 the timing interval started with the toaster cold and the lower end 77 of bimetal 76 is shown free of lug 78 of lever 52. The toaster as a whole will gradually heat up from the heat of the heaters 20 as the cone 55 is slowly rotated in performing its timing action. Toward the end of the first toasting interval the lower end 77 of bimetal 76 will contact the lug 78 of lever 52 and pivot it as well as the cone 55 counterclockwise. Since the surface of the cone 55 is longitudinally curved in the arc of a circle having its center at pivot point 51 of arm 52, the surface of the cone 55 will remain in frictional contact with the gear 64. However, as the cone 55 moves to the right the radius of the surface of the cone in contact with the gear 64 becomes smaller with the result that the speed of rotation of the cone 55 is increased and that increase takes place in infinitesimal increments as the toaster temperature rises.

Eventually, the cam 65 will come into contact with the end 67 of lever 26 and pivot it counterclockwise. The parts are so designed that just before the cam 65 rides free of the end 67 of lever 26, the hook 25 will be moved from above the lug 32 permitting the carriage 17 and its associated parts to move upwardly under the bias of spring 24. The contacts 80—81 will be opened deenergizing the motor 60 and heater 20. The motor 60 being the type which stops abruptly when deenergized, the rotation of the cone 55 will cease with the end of the cam 65 adjacent the shoulder 66 positioned above the end 67 of lever 26, it being held in that position by the light spring 56'. As the carriage 17 moves upwardly the member 48 will move out of engagement with the hook 47 of rod 45 and permit the arm 44 and with it the arm 52 and cone 55 to move counterclockwise about the pivot point 41. The surface of the cone 55 then in contact with the gear 64 will move into the dot-dash arc B—B and out of contact with the gear 64.

The operation for toasting cycles after the first is substantially the same as that described above except that the bimetal 76 may not have cooled sufficiently to move its lower end 77 far enough to the left to prevent the lug 78 from contacting it at the initiation of the next toasting interval. Under such circumstances the end 77 of bimetal 76 will form a stop to predetermine the axial point on the surface of the cone 55 which will contact the gear 64 and thus predetermine the initial speed of rotation of the cone 55. In any event, the bimetal 76 is so designed as to compensate for rises in toaster temperature regardless of how fast the toaster is successively operated.

If medium or dark toast is desired the handle 75 is moved to the left to the proper position. That will pivot the lever 70 clockwise so as to move the lower end 77 of bimetal 76 away from the lug 78 and prolong the time it takes the lower end 77 of bimetal 76 to contact lug 78 and thus prolong the toasting interval and cook the toast to a browner color.

It is to be noted that the manual adjustment is superimposed upon the thermostatic control for the timed interval.

In the modification of Fig. 3 the cone 55 rotates less than a complete revolution in timing toasting intervals and is returned to its initial position at the termination of toasting intervals. As is obvious, the gear ratio must be changed to provide for the decrease in the angle of rotation of the cone as it performs its timing action.

At the initiation of toasting intervals the cone 55 is always in the position shown in Fig. 3 with the shoulder 66 of cam 65 in contact with the stop pin 85. When the arms 23 are moved downwardly, the cone 55 is moved into contact with the friction gear 64 and the motor 60 and heaters 20 are energized as described in the operation of the modification of Figs. 1 and 2. However, the latch arm 26 is operated in a slightly different manner.

As the arms 23 are moved downwardly the lug 32 engages the cam surface 31 of lever 26 and moves it counterclockwise to permit the lug 32 to move beneath the hook 25 at which time the latch arm 26 moves to latching position with its end 67 in a position to be contacted by cam 65 when the cone 55 is rotated in performing its timing action.

The thermal element 76 and the manual adjustment operate to speed up the timing operation as in the first modification.

The cam 65 contacts the end 67 of lever 11 to release the carriage 17 for upward movement as in the first modification, except that the cone 55 is immediately returned to its original starting position by spring 86 when the surface of the cone moves out of frictional contact with the gear 64.

While the motor 60 has been shown and described as electrically connected to the contacts 80 so as to be simultaneously energized with the heaters 20 when the carriage 17 is moved to toasting position, a separate manual switch may be provided for controlling the motor or it may rotate continuously as long as the toaster is plugged into an electrical outlet.

As explained above, the cone 55 is always moved out of contact with the gear 64 when the carriage 17 moves to receiving position and is always brought into contact with the gear 64 when the carriage is moved to toasting position. For that reason it is not necessary that the motor be simultaneously controlled with the heaters.

The above arrangement is particularly adaptable to toasters having constant speed spring motors which are wound each time the carriage is moved to toasting position. If the spring motor does not completely run down during toasting intervals it may do so between toasting intervals.

While I have shown and described but two modifications of my invention it is to be understood that those modifications are to be taken as illustrative only and not in a limiting sense. I do not wish to be limited to the particular structure shown and described but to include all equivalent variations thereof except as limited by the scope of the claims.

I claim:

1. A toaster comprising, a bread carriage movable from receiving to toasting position, heating means for performing the toasting function, a constant speed power source, means for moving said carriage to toasting position, means actuated by movement of said carriage to toasting position for energizing said heating means, means for latching said carriage in toasting position, power actuated latch release mechanism, a variable speed transmission for transmitting power from said power source to said latch release mechanism, first movable means for varying the speed ratio of said transmission and second movable means actuated by movement of said carriage to toasting position for engaging said transmission with said power source and by movement of said carriage to receiving position for disengaging said transmission from said power source.

2. A toaster according to claim 1 including thermally responsive means responsive to toaster temperature coacting with said first movable means for increasing the speed ratio of said transmission as the toaster temperature rises.

3. A toaster according to claim 2 including manually actuatable means superimposed upon said thermally responsive means and coacting therewith for further varying the speed ratio of said transmission.

4. A toaster according to claim 3 in which said manually actuatable means is operable to move said thermally responsive element toward and away from said first movable means.

5. A toaster according to claim 1 in which said transmission includes a friction gear driven at constant speed by said constant speed power source, and a convex cone gear movable into contact with said friction gear upon movement of said carriage to toasting position.

6. A toaster according to claim 5 in which said first movable means comprises a first arm pivoted adjacent one end thereof and rotatably carrying said cone gear adjacent its other end, the convex surface of said cone lying in the arc of a circle the center of which is the pivot point of said first arm.

7. In a toaster according to claim 6 in which said second movable means comprises a second arm pivoted adjacent one end thereof to which said first arm is pivoted and means engaged by movement of said carriage to toasting position for pivoting said first and second arms about the pivot point of said second arm to move the convex surface of said cone into contact with said friction gear.

8. A toaster according to claim 6 including a bimetallic element responsive to changes in toaster temperature and having a free end movable into contact with said first arm to move the convex surface of said cone axially relative to said friction gear to vary the speed ratio between said gear with variations in toaster temperature.

9. A toaster according to claim 8 including manually actuatable means for moving the free end of said bimetallic element toward and away from said first arm to further vary the speed ratio between the two gears.

10. A toaster comprising, heating means for performing the toasting function, a bread carriage movable from receiving to toasting position, a releasable latch for latching said carriage in toasting position, switch means operable upon movement of said carriage to toasting position for energizing said heating means, a friction gear, means for driving said gear at a constant speed, a cone gear adapted to be driven by said friction gear, first movable means for moving said cone gear lengthwise of said friction gear with the surface of the cone in contact with the periphery of said friction gear, second movable means operable to move the surface of said cone gear into and out of contact with said friction gear, means actuated by movement of said carriage coacting with said second movable means and operable upon movement of said carriage to toasting position to move said gears into contact with each other and by movement of said carriage to receiving position to move said gears out of contact with each other and cam means on said cone gear engageable with said latch for releasing said carriage for movement to receiving position upon rotation of said cone gear through a predetermined angle.

11. A toaster according to claim 10 including a bimetallic element having a free end engageable with said first movable means and responsive to variations in toaster temperature to move said cone gear along said friction gear to vary the speed ratio between said gears with variations in toaster temperature.

12. A toaster according to claim 11 including manually actuatable means operable to move the free end of said bimetallic element toward and away from said first movable means to further vary the speed ratio between said gears.

13. A toaster according to claim 10 in which said first movable means comprises a first arm pivoted adjacent one end thereof and rotatably carrying said cone gear adjacent its other end and said cone gear having a longitudinal arc shaped surface the center of which is the pivot point of said first arm whereby the surfaces of said gears will remain in contact with each other as said first arm is pivoted back and forth.

14. A toaster according to claim 13 including a bimetallic element responsive to changes in toaster temperature having a free end engageable with said second arm and operable to move the point of contact between said gears toward the apex of said cone gear upon rises in toaster temperature to increase the speed ratio between said gears with rises in toaster temperature.

15. A toaster according to claim 14 including manually actuatable means operable to move the free end of said bimetallic element toward and away from said first arm to further vary the speed ratio between said gears.

16. A toaster according to claim 13 in which said second movable means includes a second arm pivoted adjacent one end thereof and having said first arm pivoted thereto and operable upon pivotal movement thereof to move said gears into and out of contact with each other, said carriage movement actuated means coacting with said second arm to move said gears into contact with each other when said carriage is moved to toasting position and to move them out of contact with each other when said carriage is moved to receiving position.

17. A toaster according to claim 16 including a bimetallic element responsive to changes in toaster temperature having a free end engageable with said first arm and operable to move the point of contact between said gears toward the apex of said cone upon rises in toaster temperature to increase the speed ratio between said gears with rises in toaster temperature.

18. A toaster according to claim 17 including manually actuatable means operable to move the free ends of said bimetallic element toward and away from said first arm to further vary the speed ratio between said gears.

RICHARD H. SMITH.

References Cited in the file of this patent

UNITED STATES PATENTS

| Number | Name | Date |
| --- | --- | --- |
| 1,763,509 | Gates | June 10, 1930 |
| 1,987,703 | O'Neill | Jan. 15, 1935 |
| 2,347,611 | Purpura | Apr. 25, 1944 |
| 2,378,073 | Felver et al. | June 12, 1945 |
| 2,567,075 | Lindberg | Sept. 4, 1951 |
| 2,609,044 | Stanton | Sept. 2, 1952 |
| 2,621,584 | Palmer | Dec. 16, 1952 |